(12) United States Patent
Jeong (10) Patent No.: US 10,085,119 B2
(45) Date of Patent: Sep. 25, 2018

(54) SYSTEM AND METHOD FOR PROVIDING SERVICE

(71) Applicant: SAMSUNG SDS CO., LTD., Seoul (KR)

(72) Inventor: Tae-Hwan Jeong, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 15/596,624

(22) Filed: May 16, 2017

(65) Prior Publication Data

US 2017/0347235 A1 Nov. 30, 2017

(30) Foreign Application Priority Data

May 24, 2016 (KR) ........................ 10-2016-0063584

(51) Int. Cl.
| | | |
|---|---|---|
| *H04M 1/66* | (2006.01) | |
| *H04W 4/02* | (2018.01) | |
| *H04W 4/021* | (2018.01) | |

(52) U.S. Cl.
CPC ........... *H04W 4/023* (2013.01); *H04W 4/021* (2013.01)

(58) Field of Classification Search
CPC .... H04W 4/02; H04W 64/00; H04L 29/08657
USPC .............. 455/410–414.3, 456.1–456.3, 466
See application file for complete search history.

(56) References Cited

U.S. PATENT DOCUMENTS

| | | | | |
|---|---|---|---|---|
| 5,943,653 A | * | 8/1999 | Ross | G06Q 10/02 705/14.35 |
| 6,473,763 B1 | * | 10/2002 | Corl, Jr. | G06F 17/30985 |
| 2004/0181525 A1 | * | 9/2004 | Itzhak | G06F 17/30864 |
| 2007/0162597 A1 | * | 7/2007 | Tanaka | G06F 21/35 709/224 |
| 2008/0172273 A1 | * | 7/2008 | Rackham | G06Q 10/06 705/7.39 |
| 2012/0072441 A1 | * | 3/2012 | True | G06Q 10/10 707/769 |
| 2013/0223263 A1 | * | 8/2013 | Luo | H04W 24/02 370/252 |
| 2014/0259121 A1 | * | 9/2014 | Blewett | H04L 9/083 726/4 |

(Continued)

*Primary Examiner* — Dai A Phuong
(74) *Attorney, Agent, or Firm* — Sughrue Mion, PLLC (57) ABSTRACT

Provided is a service providing system and method. The service providing method according to an embodiment of the present disclosure includes recognizing, by a service provider terminal, a user terminal by transmitting and receiving at least one signal to and from the user terminal; transmitting, by the service provider terminal, a service request message to a service server after recognizing the user terminal, the service request message including identification information of a service being requested; determining, by the service server, a type of the service to be provided to the user terminal based on the identification information of the service included in the service request message; receiving, by the service provider terminal and from the service server, a service key corresponding to the service and transmitting the service key to the user terminal; receiving, by the service server and from the user terminal, the service key; and transmitting, to the user terminal and by the service server, a service execution code used for providing the service.

14 Claims, 6 Drawing Sheets

(56) References Cited

U.S. PATENT DOCUMENTS

| | | | | |
|---|---|---|---|---|
| 2014/0373131 A1* | 12/2014 | Kudelski | ................ | G06F 21/34 |
| | | | | 726/18 |
| 2016/0057571 A1* | 2/2016 | Florins | ................ | H04W 4/021 |
| | | | | 455/456.3 |
| 2016/0080334 A1* | 3/2016 | Hamilton | ................ | H04L 67/26 |
| | | | | 713/168 |
| 2016/0277927 A1* | 9/2016 | Lee | ..................... | H04W 76/021 |
| 2017/0339164 A1* | 11/2017 | Oberheide | ............. | H04L 63/18 |

* cited by examiner

SYSTEM AND METHOD FOR PROVIDING SERVICE

CROSS-REFERENCE TO RELATED APPLICATION

This application claims priority from Korean Patent Application No. 2016-0063584, filed on May 24, 2016, the disclosure of which is incorporated herein by reference in its entirety.

BACKGROUND

1. Field

The present disclosure relates to a technology for providing O2O (online-to-offline) services.

2. Discussion of Related Art

In recent years, the use of O2O (online-to-offline) service has been increased due to the development of information communication technology and near field communication technology. The O2O service is a service that connects online and offline, and corresponds to, for example, an offline service provided by an online order or operation. Specifically, the O2O service may be, for example, a theater ticket issuance service, a parking ticket issuance and parking fee automatic calculation service, a coffee shop drink ordering and notification service, and the like.

In general, in order to provide such an O2O service to a user, the user must be authenticated through various user authentication methods such as NFC (near field communication) authentication, QR code authentication, and the like, and such a user authentication method may vary depending on the user's information and a type of a corresponding service. However, in the case of a complex mall that provides dozens to hundreds of O2O services, it is practically impossible to carry out such authentication procedures one by one.

In addition, in order to provide the O2O service to the user, a separate mobile application for providing service contents to the authenticated user must be installed in a user terminal, and the user must separately install different types of mobile applications for each service. However, when the number of kinds of O2O services provided by a service provider increases, the number of mobile applications to be installed in the user terminal also increases. In this case, as the mobile applications installed in the user terminal are repeatedly executed, a large amount of battery is consumed and resource waste of the user terminal is increased. In addition, most O2O services are value-added services, so it is not easy for a user to install all of the mobile applications for providing the service, except for a specific mobile application. This causes the utilization rate of the user's O2O service to deteriorate.

SUMMARY

The present disclosure is directed to a technology for efficiently providing various services required by a user to the user.

According to an aspect of the present disclosure, there is provided a service providing method including: recognizing, by a service provider terminal, a user terminal by transmitting and receiving at least one signal to and from the user terminal; transmitting, by the service provider terminal, a service request message to a service server after recognizing the user terminal, the service request message including identification information of a service being requested; determining, by the service server, a type of the service to be provided to the user terminal based on the identification information of the service included in the service request message; receiving, by the service provider terminal and from the service server, a service key corresponding to the service and transmitting the service key to the user terminal; receiving, by the service server and from the user terminal, the service key; and transmitting, to the user terminal and by the service server, a service execution code used for providing the service.

Here, the identification information of the service included in the service request message may vary depending on an installation location of the service provider terminal.

Also, the transmitting of the service execution code to the user terminal may include transmitting the service execution code to the user terminal in response to a first service key received by the service provider terminal coinciding with a second service key received by the service server from the user terminal.

Also, after the transmitting of the service execution code to the user terminal, the service providing method may further include: deleting, by the user terminal, the service execution code.

Also, the deleting of the service execution code may include one of deleting the service execution code in response to the service being completely provided, deleting the service execution code in response to a predetermined time elapsing from a time when the service execution code is received from the service server, and deleting the service execution code in response to a location of the user terminal being out of a predetermined service area.

Also, the deleting the service execution code may include predicting an execution probability of each of service execution codes provided by the user terminal in accordance with an execution record of the service execution code in the user terminal, and deleting one or more of the service execution codes provided by the user terminal in accordance with the execution probability.

Also, the deleting the service execution code may include deleting the service execution code of which the execution probability is less than or equal to a predetermined threshold value among the service execution codes provided by the user terminal.

According to another aspect of the present disclosure, there is provided a service providing method includes: transmitting, by a service provider terminal, a service request message to a service server, the service request message including identification information of a service being requested; determining, by the service server, a type of the service to be provided to a user terminal based on the identification information of the service included in the service request message; transmitting, by the service server, a service key corresponding to the service to the service provider terminal; transmitting, by the service provider terminal, the service key to the user terminal located in a predetermined service area; receiving, by the service server and from the user terminal, the service key; and transmitting, to the user terminal and by the service server, a service execution code used for providing the service.

Here, the identification information of the service included in the service request message may vary depending on an installation location of the service provider terminal.

Also, the transmitting of the service execution code to the user terminal may include transmitting the service execution code to the user terminal in response to a first service key received by the service provider terminal coinciding with a second service key received by the service server from the user terminal.

Also, after the transmitting of the service execution code to the user terminal, the service providing method may further include: deleting, by the user terminal, the service execution code.

Also, the deleting the service execution code may include one of deleting the service execution code in response to service being completely provided, deleting the service execution code in response to a predetermined time elapsing from a time when the service execution code is received from the service server, and deleting the service execution code in response to a location of the user terminal being out of a predetermined service area.

Also, the deleting the service execution code may include predicting an execution probability of each of service execution codes provided by the user terminal in accordance with an execution record of the service execution code in the user terminal, and deleting one or more of the service execution codes provided by the user terminal in accordance with the execution probability.

Also, the deleting the service execution code may include deleting the service execution code of which the execution probability is less than or equal to a predetermined threshold value among the service execution codes provided by the user terminal.

According to still another aspect of the present disclosure, there is provided a service providing system including: a user terminal, a service provider terminal configured to recognize the user terminal by transmitting and receiving at least one signal to and from the user terminal, and generate a service request message in accordance with the recognition of the user terminal; a service server configured to receive the service request message from the service provider terminal, the service request message including identification information of a service being requested, determine a type of the service to be provided to the user terminal based on the identification information of the service included in the service request message, and transmit a service key corresponding to the service to the service provider terminal; wherein the user terminal is configured to receive the service key from the service provider terminal and transmit the service key to the service server, and wherein the service server further configured to transmit, to the user terminal, a service execution code used for providing the service.

According to yet another aspect of the present disclosure, there is provided a service providing system including: a user terminal, a service provider terminal configured to generate a service request message, the service message including identification information of a service being requested; a service server configured to receive the service request message from the service provider terminal, determine a type of the service to be provided to the user terminal based on the identification information of the service included in the service request message, and transmit a service key corresponding to the service to the service provider terminal; wherein the user terminal that is located in a predetermined service area, and the user terminal is configured to receive the service key from the service provider terminal, and transmit the service key to the service server, and wherein the service server further configured to transmit, to the user terminal, a service execution code used for providing the service.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, specific embodiments of the present disclosure will be described with reference to the accompanying drawings. The following detailed description is provided to assist a comprehensive understanding of the methods, apparatus, and/or systems described herein. However, this is merely an example and the present disclosure is not limited thereto.

In describing embodiments of the present disclosure, detailed descriptions of well-known functions or constructions will be omitted so as not to obscure the gist of the present disclosure. Also, the following terms are defined in consideration of the functions of the present disclosure, and may be differently defined according to a user, the intention of an operator or custom. Therefore, the terms should be defined based on the overall contents of the specification. Terminologies used in the present specification are to describe the exemplary embodiments and not to limit the present disclosure. In terms used herein, singular expressions include plural expressions unless explicitly construed otherwise in the context thereof. It should be appreciated that the terms "include(s)," "comprise(s)", "including" and "comprising" are intended to indicate the presence of the characteristics, numbers, steps, operations, elements, or parts described herein, or combinations thereof, but are not intended to exclude the possibility of presence or addition of one or more other characteristics, numbers, steps, operations, elements, parts, or combinations thereof.

Figure 1:
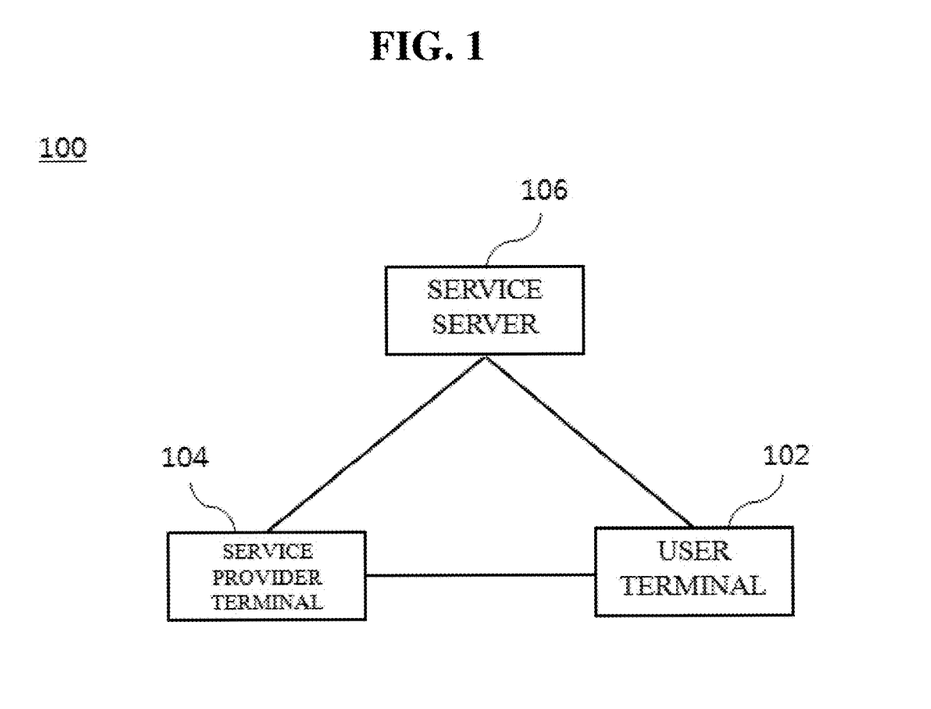
FIG. 1 is a block diagram illustrating a detailed configuration of a service providing system according to an embodiment of the present disclosure.

FIG. 1 is a block diagram illustrating a detailed configuration of a service providing system 100 according to an embodiment of the present disclosure. As illustrated in FIG. 1, the service providing system 100 according to an embodiment of the present disclosure includes a user terminal 102, a service provider terminal 104, and a service server 106.

The user terminal 102 may be a terminal possessed by a user, and may be, for example, a portable communication device such as a smart phone, a tablet PC, or a PDA, a wearable device such as a smart watch or smart glasses, or the like. The user may receive various services from a service provider through the user terminal 102. In the present embodiments, the services may be, for example, O2O (online-to-offline) services. The O2O service may be a service that connects online and offline, and corresponds to, for example, an offline service provided by an online order or operation. Specifically, the O2O service may be, for example, a theater ticket issuance service, a parking ticket issuance and parking fee automatic calculation service, a coffee shop drink ordering and notification service, and the like.

The user may enter a service area while holding the user terminal 102, and the service provider terminal 104 may recognize the user terminal 102. In the present embodiments, the service area may be used in a broad sense to include not only an area in which the service is actually provided (e.g., a theater, a parking lot, a coffee shop, etc.) but also an area that is geographically close to the area (e.g., an area located within a predetermined radius from a corresponding store such as a parking lot entrance, etc.). In addition, the service provider terminal 104 may be installed in the service area, as a terminal owned or handled by a corresponding service provider. As an example, the service provider terminal 104 may recognize the user terminal 102 by transmitting and receiving signals to and from the user terminal 102 existing within a predetermined distance from the service provider terminal 104. As the service provider terminal 104 recognizes the user terminal 102, it may transmit a service key to the user terminal 102.

In addition, the service provider terminal 104 may transmit the service key to the user terminal 102 located in the predetermined service area without recognizing the user terminal 102. As an example, the service provider terminal 104 may display an optical code (e.g., a QR code, a bar code, etc.) corresponding to the service key, and the user terminal 102 may photograph the optical code using a photographing means (e.g., a camera, etc.). The user terminal 102 may identify the optical code using a built-in optical code reader (e.g., a QR code reader, a bar code reader, etc.), and thereby obtain the service key. In addition, the service provider terminal 104 may transmit the service key to the user terminal 102 located in the predetermined service area through RF radio signals (e.g., Wi-Fi signals), Li-Fi signals, sound signals (including both sound signals at audible frequencies and sound signals at non-audible frequencies), or the like. That is, the service provider terminal 104 may transmit the service key to an unspecified number of user terminals 102 located in the predetermined service area.

In this manner, the user terminal 102 may receive the service key from the service provider terminal 104. Next, the user terminal 102 may transmit the service key and identification information of the user terminal 102 to the service server 106. In the present embodiments, the service key is a key for identifying services provided to the user terminal 102, and may be constituted of, for example, one or more numbers, letters, or a combination thereof (e.g., an ascii code of several to several hundred bytes in length). The service key may vary according to a type of a corresponding service, a method in which the service provider terminal 104 authenticates the user terminal 102, and the like, and have a random value. In addition, the identification information of the user terminal 102 may be, for example, a MAC address, a serial number, or the like of the user terminal 102. The service server 106 may authenticate the user terminal 102 using the identification information of the user terminal 102, and determine a type of a service to be provided to the user terminal 102 using the service key. Next, the service server 106 may transmit a service execution code used for providing the service to the user terminal 102.

The service provider terminal 104 may be a terminal owned or handled by a corresponding service provider, and may be, for example, a desktop, a notebook, a tablet PC, a smart phone, or the like. In addition, the service provider terminal 104 may be installed in a service area, and may include, for example, an access point, a beacon, an NFC (near field communication) reader, a display means (e.g., a display means used for displaying a QR code, a bar code, etc.), a sound sensor, and the like. The service provider terminal 104 may recognize the user terminal 102 by transmitting and receiving signals to and from the user terminal 102 existing within the predetermined distance from the service provider terminal 104 and thereby transmit the service key to the user terminal 102. In addition, the service provider terminal 104 may transmit the service key to the user terminal 102 located in the predetermined service area without recognizing the user terminal 102.

As an example, a first service provider terminal 104 installed in a first service area may include a beacon, and recognize the user terminal 102 by transmitting and receiving Bluetooth signals to and from the user terminal 102 within a distance of 50 m from the first service provider terminal 104 and thereby transmit the service key to the user terminal 102. As another example, a second service provider terminal 104 installed in a second service area may display a QR code through a display means, and provide the service key to the user terminal 102 as the user terminal 102 identifies the QR code.

Such a service key may be provided from the service server 106 to the service provider terminal 104.

As an example, the service provider terminal 104 may transmit a service request message to the service server 106 as it recognizes the user terminal 102 through the Bluetooth signals, NFC data, etc., and receive a service key corresponding to identification information of the service included in the service request message from the service server 106. At this time, the identification information of the service included in the service request message may vary depending on the installation location, supported feature set, or the environment type (for example, if the service provider terminal 104 is in very noisy place, sound will not be an option to deliver service key in the place) of the service provider terminal 104. For example, the identification information of the service included in the service request message may be information indicating a theater ticket issuance service when a location where the service provider terminal 104 is installed is a theater, or may be information indicating a coffee shop drink ordering and notification service when the location where the service provider terminal 104 is installed is a coffee shop. In addition, the service request message may further include identification information of the user terminal 102, for example, a MAC address, a serial number, or the like of the user terminal 102, and the identification information of the user terminal 102 may be used as information for authenticating the user terminal 102.

As another example, the service provider terminal 104 may transmit a service request message including identification information of a predetermined service to the service server 106, and receive a service key corresponding to the identification information of the service from the service server 106. Accordingly, the service provider terminal 104 may transmit the service key to the user terminal 102 located in the predetermined service area. For example, the service provider terminal 104 may generate an optical code (e.g., a QR code, a bar code, etc.) corresponding to the service key, and display the generated optical code. The user may photograph the optical code through a photographing means (e.g., a camera, etc.) built in the user terminal 102. The user terminal 102 may identify the optical code using an optical code reader (e.g., a QR code reader, a bar code reader, etc.)

provided therein, and thereby obtain the service key. In addition, as described above, the service provider terminal 104 may transmit the service key to an unspecified number of user terminals 102 located in the predetermined service area through RF radio signals, Li-Fi signals, sound signals, or the like, and in this case, the user terminal 102 that first transmits the corresponding service key to the service server 106 may be provided with the corresponding service. When the user terminal 102 transmits the service key to the service server 106, another user terminal 102 may receive a new service key from the service provider terminal 104, and therefore the above-described process may be repeatedly performed. Meanwhile, the service key may be encrypted in the service server 106, and the encrypted service key may be transmitted to the user terminal 102 via the service provider terminal 104.

The service server 106 transmits the service key to the service provider terminal 104 in accordance with the service request message. As described above, the service server 106 may receive the service request message from the service provider terminal 104. The service request message may include identification information of a corresponding service. Accordingly, the service server 106 may determine a type of a corresponding service to be provided to the user terminal 102 from the identification information of the service included in the service request message, and transmit the service key corresponding to the service to the service provider terminal 104.

In addition, the service server 106 may transmit a service execution code used for providing the service to the user terminal 102. As described above, the user terminal 102 may transmit the service key received from the service provider terminal 104 and its identification information to the service server 106.

First, the service server 106 may authenticate the user terminal 102 using the identification information of the user terminal 102 received from the user terminal 102. As an example, the service server 106 may authenticate the user terminal 102 by comparing the identification information of the user terminal 102 received from the user terminal 102 with the identification information of the user terminal 102 included in the service request message. As described above, when recognizing the user terminal 102 through Bluetooth signals, NFC data, or the like, the service provider terminal 104 may transmit the service request message including the identification information of the user terminal 102 to the service server 106, and the service server 106 may authenticate the user terminal 102 using the identification information of the user terminal 102. When the identification information of the user terminal 102 received from the user terminal 102 coincides with the identification information of the user terminal 102 included in the service request message, the service server 106 may determine that the authentication of the user terminal 102 is successful.

Next, the service server 106 may confirm the type of the service to be provided to the user terminal 102 using the service key. To this end, the service server 106 may compare the service key transmitted to the service provider terminal 104 and the service key received from the user terminal 102. When the service key transmitted to the service provider terminal 104 coincides with the service key received from the user terminal 102, the service server 106 may transmit the service execution code used for providing the service to the user terminal 102. Here, the service execution code may be a set of various commands used for providing services, and may be constituted of, for example, a set of commands for performing simple functions such as a number display, a ticket image display, a message transmission, an alarm, and the like. In addition, the service server 106 may encrypt the service execution code, and transmit the encrypted service execution code to the user terminal 102.

The user terminal 102 may receive the service execution code from the service server 106, and receive a corresponding service from a corresponding service provider using the service execution code. When the service execution code received from the service server 106 is encrypted, the user terminal 102 may decrypt the encrypted service execution code, and then receive the corresponding service from the corresponding service provider using the service execution code. As an example, a ticket image of a theater may be displayed on the user terminal 102 as the service execution code is executed in the user terminal 102, and the corresponding service provider may allow a user to enter the theater by checking the ticket image. The service execution code may be, for example, one or more numbers, letters, or a combination thereof, and may have a different value for each corresponding service.

In this manner, the user terminal 102 may receive one or more service execution codes from the service server 106, respectively. As an example, when a user visits a parking lot, a theater, and a coffee shop in turn while holding the user terminal 102, the user terminal 102 may receive a service execution code corresponding to a parking ticket issuance and parking fee automatic calculation service, a service execution code corresponding to a theater ticket issuance service, and a service execution code corresponding to a coffee shop drink ordering and notification service from the service server 106, respectively. The user terminal 102 may respectively store one or more service execution codes received from the service server 106 in an internal repository (not shown), and execute the stored one or more service execution codes in corresponding service areas to receive corresponding services from corresponding service providers.

In addition, the user terminal 102 may delete the corresponding service execution codes when the corresponding services are completely provided. For example, the user terminal 102 may receive a service provision completion message from the service provider terminal 104 or the service server 106, thereby deleting the service execution code stored in the internal repository.

In addition, the user terminal 102 may delete the corresponding service execution codes when the corresponding services are completely provided. For example, the user terminal 102 may receive a service provision completion message from the service provider terminal 104 or the service server 106, thereby deleting the service execution code stored in the internal repository.

In addition, the user terminal 102 may delete the corresponding service execution code when a predetermined time elapses from a time when the service execution code is received from the service server 106 or when the location of the user terminal 102 is out of the predetermined service area. For example, when 12 hours have elapsed from the time when the service execution code is received from the service server 106, or when the location of the user terminal 102 is out of the service area associated with the service execution code, the user terminal 102 may delete the corresponding service execution code.

In addition, the user terminal 102 may predict an execution probability of each service execution code provided by the user terminal 102 in accordance with an execution record of the service execution code in the user terminal 102, and delete one or more of the service execution codes provided by the user terminal 102 in accordance with the execution probability. As an example, when it is assumed that a probability of using a service St (i.e., an execution probability of a service code corresponding to the service St) when services S1, S2, . . . , and Sk are used by a user is $P_{feature}$, $P_{feature}$ may be calculated as follows.

$$P_{feature}=P(S_t|S_1,S_2, \ldots ,S_k)$$

At this time, when it is assumed that each service S is used independently, $P_{feature}$ may be calculated as follows.

$$P_{feature} = \prod_{k \to n} P(S_t | S_k)$$

For example, a probability that a food corner voucher offering service S4 is used when a user visits a large shopping mall and respectively uses a parking ticket issuance service 51, a cultural center customer authentication service S2, and a food court waiting list issuance service S3 is as follows.

$$P(S_4|S_1,S_2,S_3)=P(S_4|S_1)P(S_4|S_2)P(S_4|S_3)$$

That is, the user terminal 102 may predict an execution probability of each of the service execution codes provided by the user terminal 102 based on the execution record of the service execution code in the user terminal 102 which has been previously stored and learned, and delete one or more of the service execution codes provided by the user terminal 102 in accordance with the execution probability. Specifically, the user terminal 102 may delete the service execution code of which the execution probability is equal to or smaller than a predetermined threshold value (e.g., 0.3 or less) among the service execution codes provided by the user terminal 102.

According to the embodiments of the present disclosure, it is possible to safely provide various services required by a user to the user through the service execution code. In addition, according to the embodiments of the present disclosure, the service execution code that is determined to be no longer required to be provided by the user terminal 102 among the service execution codes stored in the user terminal 102 may be deleted and discarded, so that the security and safety of the service execution code may be guaranteed.

In addition, the above-described processes for receiving services at the user terminal 102 may be performed through a mobile application provided at the service server 106. Specifically, a user may enter the service area while holding the user terminal 102, and the mobile application installed in the user terminal 102 may be automatically executed as the user terminal 102 enters the service area. A Wi-Fi module, a Bluetooth module, an NFC module, a QR code reader, and the like which are built in the user terminal 102 may be activated as the mobile application is executed, and the user terminal 102 may receive a service key from the service provider terminal 104 through the Wi-Fi module, the Bluetooth module, the NFC module, the QR code reader, and the like. In addition, the user terminal 102 may transmit the service key and identification information of the user terminal 102 to the service server 106, and receive a service execution code from the service server 106. In this manner, according to the embodiments of the present disclosure, battery consumption and resource waste of the user terminal 102 may be minimized by allowing a user to receive various services through one mobile application installed in the user terminal 102, so that the user does not need to separately install different types of mobile applications for each service. In addition, in this case, it is possible to reduce the inconvenience such that a service provider has to upgrade (version-up) for the purpose of changing and correcting a corresponding service and to easily change the contents of the corresponding service by simple modification of the service execution code.

Meanwhile, as described above, the user terminal 102 receives the service key from the service provider terminal 104 by attempting to make a contact with the service provider terminal 104 and transmits the received service key to the service server 106, and the service server 106 confirms the type of the service to be provided to the user terminal 102 using the service key received from the user terminal 102, but the present disclosure is not limited thereto.

As an example, the service server 106 may actively determine a service currently required by a user, and provide a service execution code to the user terminal 102 in accordance with the determination result. Specifically, the service server 106 may actively determine the service currently required by the user in consideration of a current location of the user terminal 102, proximity between the user terminal 102 and a predetermined service area, a fingerprint history of the user terminal 102 collected in the predetermined service area, an execution record of the service execution code in the user terminal 102, and the like.

As an example, when the current location of the user terminal 102 is within the predetermined service area or within a predetermined distance from the service area, the service server 106 may determine that the service provided in the service area is necessary.

As another example, the user terminal 102 may transmit identification information of another user terminal 102 detected by the user terminal 102 (or by the service provider terminal 104) and the identification information of the user terminal 102 to the service server 106 at the time of receiving a specific service execution code from the service server 106, and the service server 106 may store a list of the corresponding identification information as a key of the service area in which the user terminal 102 is located. The key (i.e., the list of the identification information) may be used as a means for authenticating whether the user terminal 102 is actually located in a corresponding service area whenever a user desires to receive a service identification code from the service server 106 in the future. The service server 106 may transmit the service execution code to the corresponding user terminal 102 only when receiving a key (i.e., the list of the identification information) similar to the stored key (i.e., the list of the identification information) from the user terminal 102.

For example, assuming that a list of identification information detected by a user terminal A in a service area X is as shown in Table 1 below, when a user terminal D enters the service area X, the service server 106 may receive a list of identification information detected by the user terminal D as shown in Table 2 below. Here, it is assumed that identification information of the service provider terminal 104 installed in the service area X is FF:FF:FF:FF:FF:FF.

TABLE 1

| User terminal | Identification information (MAC address) |
|---|---|
| X | FF:FF:FF:FF:FF:FF |
| A | 00:00:00:00:00:00 |
| B | 11:11:11:11:11:11 |
| C | 22:22:22:22:22:22 |

TABLE 2

| User terminal | Identification information (MAC address) |
|---|---|
| X | FF:FF:FF:FF:FF:FF |
| A | 00:00:00:00:00:00 |
| B | 11:11:11:11:11:11 |
| D | 33:33:33:33:33:33 |

When a key of Table 1 and a key of Table 2 are compared and the keys are determined to be similar to each other based on the comparison result (e.g., when it is determined that more than half of a plurality of pieces of identification information included in a list of identification information is the same), the service server 106 may transmit a corresponding service execution code to the user terminal D. At this time, the service server 106 may delete at least a part of previously accumulated identification information over time, or decrease or increase the reliability thereof, thereby reducing errors due to selection of the service execution code.

As another example, the service server 106 may predict an execution probability of a specific service execution code in accordance with an execution record of the service execution code in the user terminal 102, and determine that the service execution code of which the execution probability is equal to or larger than a predetermined threshold value is necessary. As described above, when it is assumed that a probability of using a service St (i.e., an execution probability of a service code corresponding to the service St) when services S1, S2, . . . , and Sk are used by a user is $P_{feature}$, $P_{feature}$ may be calculated as follows.

$$P_{feature} = P(S_t \mid S_1, S_2, \ldots, S_k)$$

$$P_{feature} = \prod_{k \to n} P(S_t \mid S_k)$$

In this manner, when it is assumed that each of a current location of the user terminal 102, proximity between the user terminal 102 and a predetermined service area, a fingerprint history of the user terminal 102 collected in the predetermined service area, an execution record of the service execution code in the user terminal 102, and the like is a feature, the user terminal 102 may collect N features $F_k$ and transmit the collected N features $F_k$ to the service server 106. The service server 106 may calculate an execution probability P(S) for the service S as follows, and provide the service execution code corresponding to the service in which the calculated value is equal to or larger than a predetermined threshold value to the user terminal 102.

$$P(S) = \sum_{k \to N} P(F_k \mid S)$$

At this time, the proximity between the user terminal 102 and a predetermined service area may be determined through RF signals transmitted and received to and from an AP, and determined further in consideration of the fingerprint history of the user terminal 102, the execution record of the service execution code in the user terminal 102, and the like.

In addition, the user terminal 102 may receive the type of the service desired to be provided from a user, and request the service execution code corresponding to the received type of the service from the service server 106.

Meanwhile, embodiments to which the service providing system 100 is applied are as follows.

(1) Retail Services Such as Shopping Malls

The service providing system 100 may be applied to fields to which O2O services have been difficult to be applied due to efficiency vs. consumed cost and hassle. As an example, the service providing system 100 may replace a paper parking ticket with an online service in a parking lot, or provide a vibration bell used for waiting for order at a cafe or a restaurant, a simple survey conducted at a school, and the like as the O2O services.

(2) Building Security Services

The service providing system 100 may strengthen the building security by providing only necessary services to a user according to a user's situation detected based on collected characteristics and restricting services that are not required. At this time, when the user terminal 102 is out of a corresponding building or place, the associated service execution code may be automatically deleted.

(3) Biometric Identification Services

The above-described service providing technology may be used in combination with a biometric identification technology such as FIDO (fast identity online) or the like. Specifically, a service key provided by the service server 106 may be used to encrypt biometric information. The service key may be encrypted and provided, and vary depending on a corresponding place or situation. Accordingly, the biometric identification technology may be added to an authentication system for authenticating a user terminal using NFC or the like in an ATM (automatic teller machine) of a bank to determine whether the corresponding user terminal actually exists at the corresponding ATM and a legitimate user uses the corresponding ATM.

Figure 2:
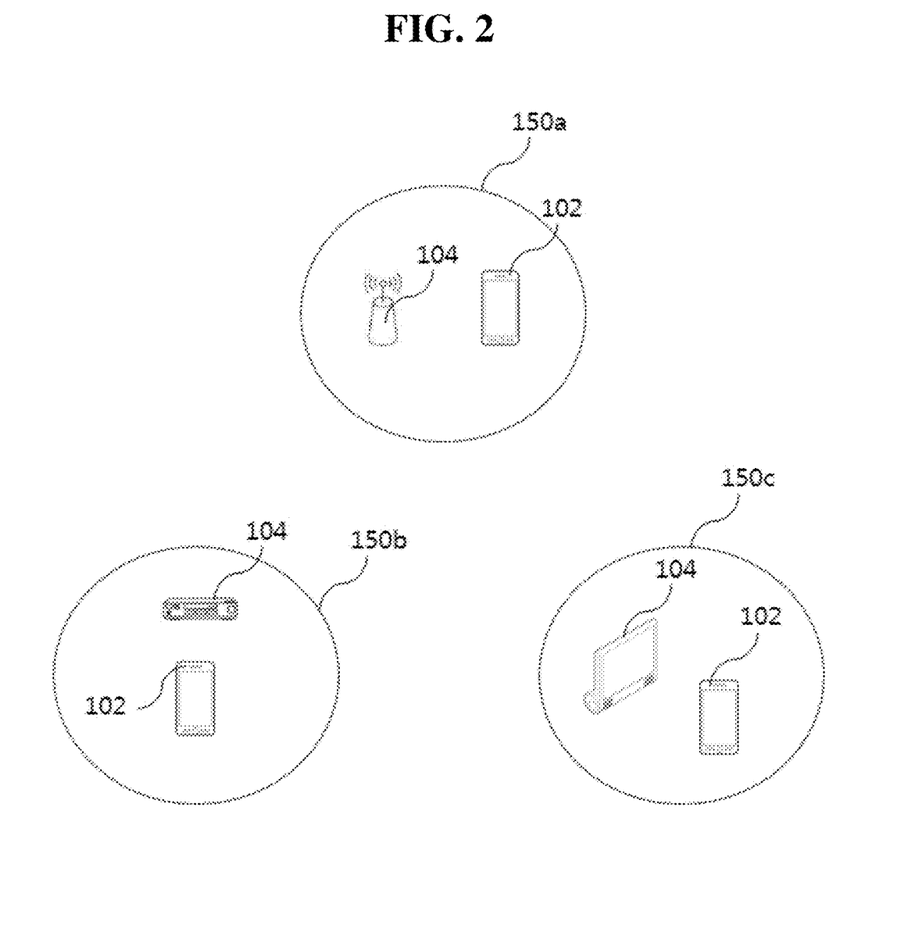
FIG. 2 is an exemplary diagram illustrating a user terminal located in a service area and a service provider terminal according to an embodiment of the present disclosure.

FIG. 2 is an exemplary diagram illustrating the user terminal 102 located in a service area and the service provider terminal 104 according to an embodiment of the present disclosure.

As illustrated in FIG. 2, when it is assumed that a first service area 150a, a second service area 150b, and a third service area 150c exist, the first service area 150a, the second service area 150b, and the third service area 150c may be, for example, a parking lot, a theater, or a coffee shop, respectively. At this time, one or more service provider terminals 104 may be installed in each of the first service area 150a, the second service area 150b, and the third service area 150c. A first service provider terminal 104, a second service provider terminal 104, and a third service provider terminal 104 may include, for example, an AP, an NFC reader, and a display means (i.e., a means for displaying a barcode, a QR code, or the like), respectively.

Accordingly, when a user visits the first service area 150a, the second service area 150b, and the third service area 150c (i.e., the parking lot, the theater, and the coffee shop) in turn while holding the user terminal 102, the user terminal 102 may receive a service execution code corresponding to a parking ticket issuance and parking fee automatic calculation service, a service execution code corresponding to a theater ticket issuance service, and a service execution code corresponding to a coffee shop drink ordering and notification service from the service server 106, respectively.

Figure 3:
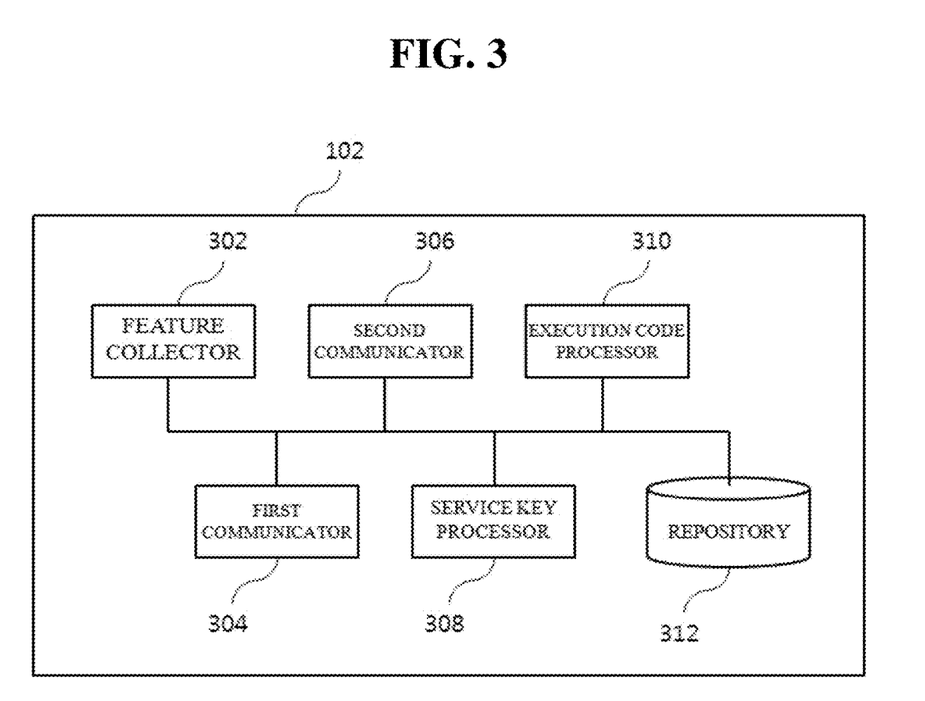
FIG. 3 is a block diagram illustrating a detailed configuration of a user terminal according to an embodiment of the present disclosure.

FIG. 3 is a block diagram illustrating a detailed configuration of the user terminal 102 according to an embodiment of the present disclosure. As illustrated in FIG. 3, the user terminal 102 according to an embodiment of the present disclosure includes a feature collector 302, a first communicator 304, a second communicator 306, a service key processor 308, an execution code processor 310, and a repository 312.

The feature collector 302 collects the above-described features for recognizing a user's situation using various communication modules (e.g., a Wi-Fi module, a Bluetooth module, an NFC module, etc.), a position measurement module (e.g., a GPS module, etc.), a sensor (e.g., a motion sensor, etc.), and the like built in the user terminal 102, and transmits the collected features to the service server 106. Here, the features may include, for example, a current location of the user terminal 102, proximity between the user terminal 102 and a predetermined service area, a fingerprint history of the user terminal 102 collected in the predetermined service area, an execution record of the service execution code in the user terminal 102, and the like. The service server 106 may determine a service currently required by a user using the various features received from the feature collector 302.

The first communicator 304 is a module that supports communication with the service provider terminal 104. The first communicator 304 may include one or more communication modules, and transmit and receive signals to and from the service provider terminal 104 through the communication module. The communication module may be, for example, a Wi-Fi module, a Bluetooth module, an NFC module, or the like. The service key processor 308 may transmit signals to the service provider terminal 104 through the first communicator 304, and thereby receive a service key from the service provider terminal 104.

The second communicator 306 is a module that supports communication with the service server 106. The user terminal 102 may access a network (not shown) through the second communicator 306, and transmit and receive signals to and from the service server 106 through the network. Here, the network may be used in a broad sense to include a wired/wireless Internet network in addition to a 3G network, a 4G network, or an LTE network provided by mobile communication providers or a packet communication network such as a WiBro network. The service key processor 308 may transmit the service key and identification information of the user terminal 102 to the service server 106 through the second communicator 306. In addition, the execution code processor 310 may receive a corresponding service execution code from the service server 106 through the second communicator 306.

The service key processor 308 receives the service key from the service provider terminal 104, and transmits the service key and the identification information of the user terminal 102 to the service server 106. As described above, the service key processor 308 may transmit signals to the service provider terminal 104 through the first communicator 304, and thereby receive the service key from the service provider terminal 104. At this time, the service key processor 308 may convert the signals into a recognizable form (e.g., NFC data, Bluetooth signals, etc.) at the service provider terminal 104, and then transmit the converted signals to the service provider terminal 104 through the first communicator 304. In addition, the service key processor 308 may transmit the service key and the identification information of the user terminal 102 to the service server 106 through the second communicator 306.

The execution code processor 310 receives the corresponding service execution code from the service server 106. As described above, the execution code processor 310 may receive the corresponding service execution code from the service server 106 through the second communicator 306. The execution code processor 310 may store the service execution code received from the service server 106 in the repository 312. In addition, the execution code processor 310 may execute the service execution code, and therefore a user may receive a corresponding service from a corresponding service provider. In addition, the execution code processor 310 may delete the service execution code stored in the repository 312 when the service is completely provided, when a predetermined time elapses from a time when the service execution code is received from the service server 106, or when the location of the user terminal 102 is out of a predetermined service area. In addition, the execution code processor 310 may predict an execution probability of each of the service execution codes stored in the repository 312 in accordance with an execution record of the service execution code in the user terminal 102, and delete one or more of the service execution codes stored in the repository 312 in accordance with the execution probability.

The repository 312 is a repository in which the service execution code received from the service server 106 is stored. As described above, the execution code processor 310 may store the service execution code received from the service server 106 in the repository 312. In addition, the execution code processor 310 may delete and discard the service execution code that is determined to be no longer required to be stored in the repository 312 among the service execution codes stored in the repository 312.

Figure 4:
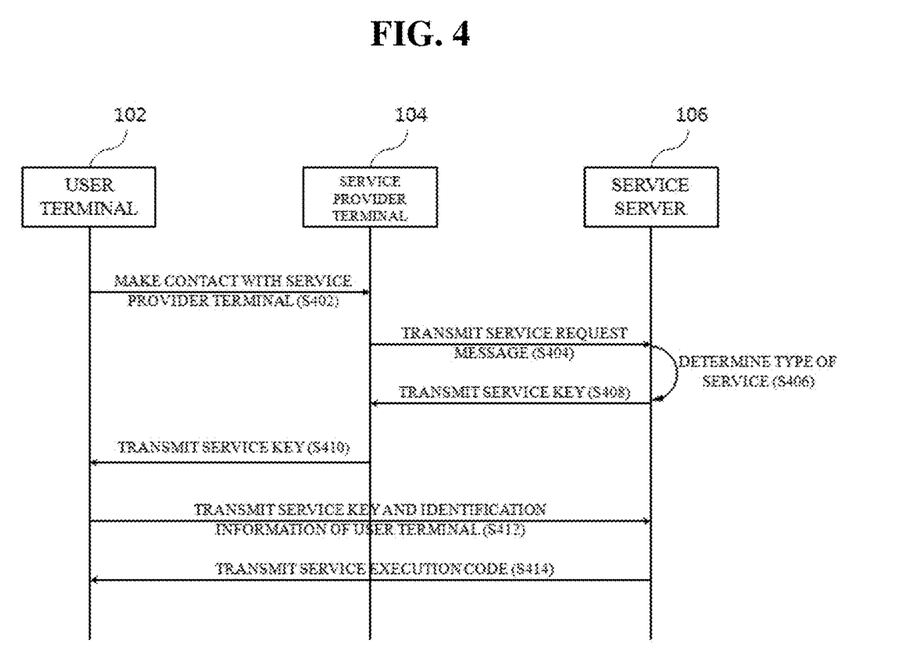
FIG. 4 is a flowchart illustrating a service providing method according to a first embodiment of the present disclosure.

FIG. 4 is a flowchart illustrating a service providing method according to a first embodiment of the present disclosure. In the illustrated flowchart, the method is described as being divided into a plurality of operations, but at least some of the operations may be performed in a different order, performed in combination with other operations, omitted, performed in separate operations, or performed with addition of one or more operations not shown.

First, in operation S402, the user terminal 102 attempts to make a contact with the service provider terminal 104. For example, the user terminal 102 may transmit NFC data to the service provider terminal 104 using an NFC module, or transmit a Wi-Fi signal to the service provider terminal 104 using a Wi-Fi module. As described above, the service provider terminal 104 may be installed in a service area, and include, for example, an AP, a beacon, an NFC reader, a display means, a sound sensor, and the like. The service provider terminal 104 may recognize the user terminal 102 by transmitting and receiving signals to and from the user terminal 102 existing within a predetermined distance from the service provider terminal 104.

Next, in operation S404, the service provider terminal 104 transmits a service request message to the service server 106 as it recognizes the user terminal 102. The service request message may include identification information of a service provided by a corresponding service provider, identification information of the user terminal 102 recognized by the service provider terminal 104, and the like.

Next, in operation S406, the service server 106 determines a type of a corresponding service to be provided to the user terminal 102 from the identification information of the service included in the service request message.

Next, in operation S408, the service server 106 transmits a service key corresponding to the service to the service provider terminal 104.

Next, in operation S410, the service provider terminal 104 transmits the service key received from the service server 106 to the user terminal 102.

Next, in operation S412, the user terminal 102 transmits the service key and the identification information of the user terminal 102 to the service server 106. Here, the identification information of the user terminal 102 may be, for example, a MAC address, a serial number, or the like of the user terminal 102.

Finally, in operation S414, the service server 106 authenticates the user terminal 102 using the identification information of the user terminal 102, and transmits a service execution code used for providing the service to the user terminal 102 when the service key transmitted to the service provider terminal 104 coincides with the service key received from the user terminal 102.

Figure 5:
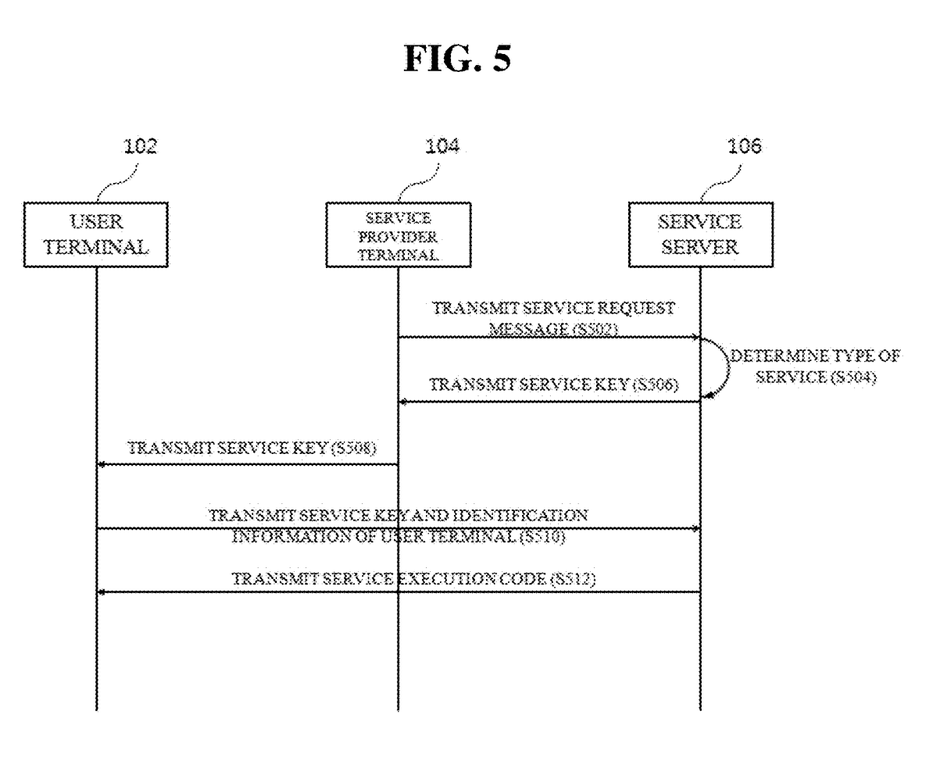
FIG. 5 is a flowchart illustrating a service providing method according to a second embodiment of the present disclosure.

FIG. 5 is a flowchart illustrating a service providing method according to a second embodiment of the present disclosure. In the illustrated flowchart, the method is described as being divided into a plurality of operations, but at least some of the operations may be performed in a different order, performed in combination with other operations, omitted, performed in separate operations, or performed with addition of one or more operations not shown.

First, in operation S502, the service provider terminal 104 transmits a service request message to the service server 106. The service request message may include identification information of a service provided by a corresponding service provider.

Next, in operation S504, the service server 106 determines a type of a corresponding service to be provided to the user terminal 102 from the identification information of the service included in the service request message.

Next, in operation S506, the service server 106 transmits a service key corresponding to the service to the service provider terminal 104.

Next, in operation S508, the service provider terminal 104 transmits the service key to the user terminal 102 located in a predetermined service area. As an example, the service provider terminal 104 may display an optical code (e.g., a QR code, a bar code, or the like) corresponding to the service key and allow the user terminal 102 to identify the optical code using a photographing means, thereby transmitting the service key to the user terminal 102. As another example, the service provider terminal 104 may transmit the service key to the user terminal 102 located in a predetermined service area through RF radio signals, Li-Fi signals, sound signals, or the like.

Next, in operation S510, the user terminal 102 transmits the service key and the identification information of the user terminal 102 to the service server 106.

Finally, in operation S512, the service server 106 authenticates the user terminal 102 using the identification information of the user terminal 102, and transmits a service execution code used for providing the service to the user terminal 102 when the service key transmitted to the service provider terminal 104 coincides with the service key received from the user terminal 102.

According to the embodiments of the present disclosure, it is possible to safely provide various services required by a user to the user through the service execution code. In addition, according to the embodiments of the present disclosure, the service execution code that is determined to be no longer required to be provided by the user terminal among the service execution codes stored in the user terminal may be deleted and discarded, so that the security and safety of the service execution code may be guaranteed.

In addition, according to the embodiments of the present disclosure, battery consumption and resource waste of the user terminal may be minimized by allowing a user to receive various services through one mobile application installed in the user terminal, so that the user does not need to separately install different types of mobile applications for each service. In addition, in this case, it is possible to reduce the inconvenience such that a service provider has to upgrade (version-up) for the purpose of changing and correcting a corresponding service and to easily change the contents of the corresponding service by simple modification of the service execution code.

Meanwhile, the embodiments of the present disclosure may include a program for performing the methods described herein on a computer, and a computer-readable recording medium including the program. The computer-readable recording medium may include program instructions, local data files, local data structures, and the like individually or in a combination. The medium may be specifically designed and constructed for the present disclosure, or may be commonly used in the field of computer software. Examples of the computer-readable recording medium include a magnetic medium such as a hard disk, a floppy disk, or a magnetic tape, an optical recording medium such as a compact disc-read only memory (CD-ROM) or a digital video disc (DVD), a magneto-optical medium such as a floptical disk, and a hardware device such as ROM, a random access memory (RAM), or a flash memory that is specially designed to store and execute program instructions. Examples of the program include not only machine language codes generated by a compiler or the like but also high-level language codes that may be executed by a computer using an interpreter or the like. At this time, the program may preferably be an ultra-small code including only logic necessary to provide an actual service, and the ultra-small code may be small in capacity and easily executed and deleted.

Figure 6:
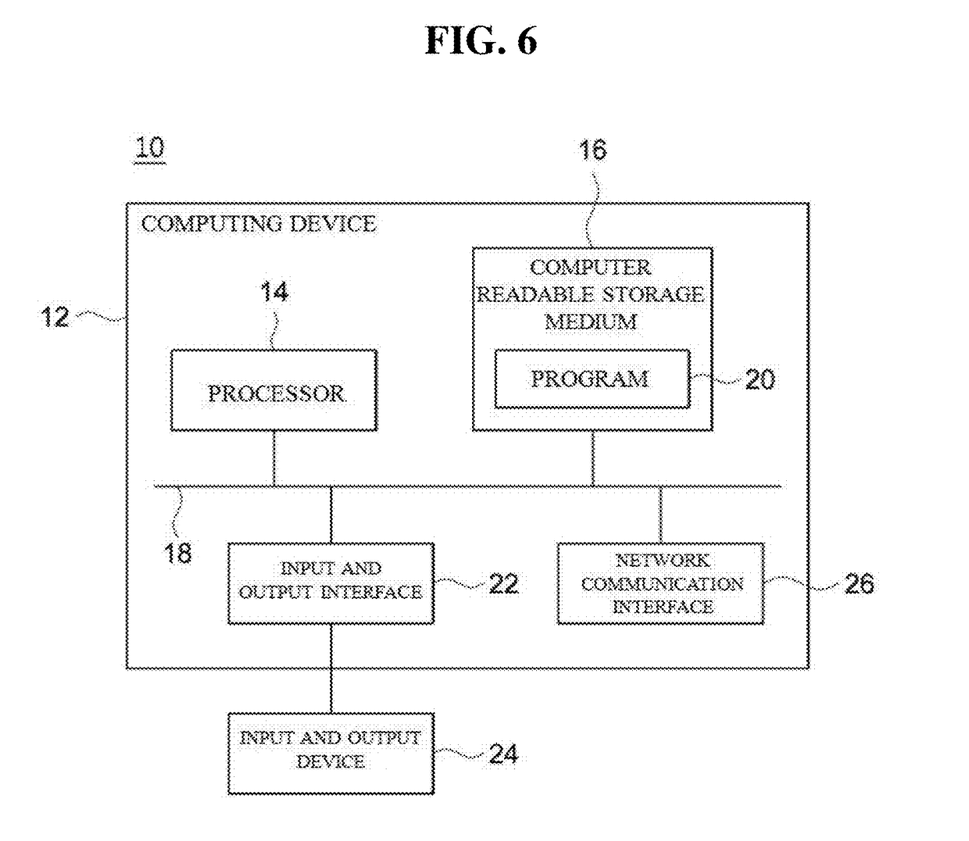
FIG. 6 is a block diagram illustrating an example of a computing environment including a computing system which is suitable for application of exemplary embodiments.

FIG. 6 is a block diagram illustrating an example of a computing environment 10 including a computing system which is suitable for application of exemplary embodiments. In an embodiment shown, each component may have a function and a capability different from those that will be described below, and an additional component may be included besides the components which will be described below.

The computing environment 10 may include a computing device 12. In an embodiment, the computing device 12 may be the user terminal 102, the service provider terminal 104, or the service server 106.

The computing device 12 may include at least one processor 14, a computer readable storage medium 16, and a communication bus 18. The processor 14 may allow the computing device 12 to be operated according to the embodiment described above. For example, the processor 14 may execute one or more programs stored in the computer readable storage medium 16. The one or more programs may include one or more computer executable instructions, and when the computer executable instructions are executed by the processor 14, allow the computing device 12 to perform the operations according to the embodiment.

The computer readable storage medium 16 may be configured to store computer executable instructions and program codes, program data, and/or other suitable forms of information. A program 20 stored in the computer readable storage medium 16 may include a set of instructions executable by the processor 14. In an embodiment, the computer readable storage medium 16 may be a memory (a volatile memory such as a random access memory, a non-volatile memory, or a combination thereof), one or more magnetic disk storage devices, optical disk storage devices, flash memory devices, different kinds of storage media which can be accessed by the computing device 12 and store wanted information, or a combination thereof.

The communication bus 18 may include the processor 14 and the computer readable storage medium 16, and interconnect various components of the computing device 12.

The computing device 12 may include one or more I/O interfaces 22 that provide an interface of one or more I/O devices 24, and one or more network communication interfaces 26. The I/O interface 22 and the network communication interface 26 may be connected to the communication bus 18. The I/O device 24 may be connected to other components of the computing device 12 through the I/O interface 22. The I/O device 24 may include an input device such as a pointing device (a mouse, a track pad, etc.), a keyboard, a touch input device (a touch pad, a touch screen, etc.), a voice or sound input device, various kinds of sensors, and/or a capturing device, and/or an output device such as a display device, a printer, a speaker, and/or a network card. The I/O device 24 may be one component configuring the computing device 12, may be included in the computing device 12, and may be connected to the computing device 12 as a device which is separate from the computing device 12.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. A service providing method comprising:
    recognizing, by a service provider terminal, a user terminal by transmitting and receiving at least one signal to and from the user terminal;
    transmitting, by the service provider terminal, a service request message to a service server after recognizing the user terminal, the service request message including identification information of a service being requested;
    determining, by the service server, a type of the service to be provided to the user terminal based on the identification information of the service included in the service request message;
    receiving, by the service provider terminal and from the service server, a service key corresponding to the service, and transmitting the service key to the user terminal;
    receiving, by the service server and from the user terminal, the service key; and
    transmitting, to the user terminal and by the service server, a service execution code used for providing the service,
    wherein the transmitting the service execution code to the user terminal comprises transmitting the service execution code to the user terminal in response to a first service key received by the service provider terminal coinciding with a second service key received by the service server from the user terminal.

2. The service providing method of claim 1, wherein the identification information of the service included in the service request message varies depending on an installation location of the service provider terminal.

3. The service providing method of claim 1, further comprising:
    after the transmitting of the service execution code to the user terminal, deleting, by the user terminal, the service execution code.

4. The service providing method of claim 3, wherein the deleting the service execution code comprises one of deleting the service execution code in response to the service being completely provided, deleting the service execution code in response to a predetermined time elapsing from a time when the service execution code is received from the service server, and deleting the service execution code in response to a location of the user terminal being out of a predetermined service area.

5. The service providing method of claim 3, wherein the deleting the service execution code comprises predicting an execution probability of each of service execution codes provided by the user terminal in accordance with an execution record of the service execution code in the user terminal, and deleting one or more of the service execution codes provided by the user terminal in accordance with the execution probability.

6. The service providing method of claim 5, wherein the deleting the service execution code comprises deleting the service execution code of which the execution probability is less than or equal to a predetermined threshold value among the service execution codes provided by the user terminal.

7. A service providing method comprising:
    transmitting, by a service provider terminal, a service request message to a service server, the service request message including identification information of a service being requested;
    determining, by the service server, a type of the service to be provided to a user terminal based on the identification information of the service included in the service request message;
    transmitting, by the service server, a service key corresponding to the service to the service provider terminal;
    transmitting, by the service provider terminal, the service key to the user terminal located in a predetermined service area;
    receiving, by the service server and from the user terminal, the service key; and
    transmitting, to the user terminal and by the service server, a service execution code used for providing the service,
    wherein the transmitting the service execution code to the user terminal comprises transmitting the service execution code to the user terminal in response to a first service key received by the service provider terminal coinciding with a second service key received by the service server from the user terminal.

8. The service providing method of claim 7, wherein the identification information of the service included in the service request message varies depending on an installation location of the service provider terminal.

9. The service providing method of claim 7, further comprising:
    after the transmitting of the service execution code to the user terminal, deleting, by the user terminal, the service execution code.

10. The service providing method of claim 9, wherein the deleting the service execution code comprises one of deleting the service execution code in response to the service being completely provided, deleting the service execution code in response to a predetermined time elapsing from a time when the service execution code is received from the service server, and deleting the service execution code in response to a location of the user terminal being out of the predetermined service area.

11. The service providing method of claim 9, wherein the deleting the service execution code comprises predicting an execution probability of each of service execution codes provided by the user terminal in accordance with an execution record of the service execution code in the user terminal, and deleting one or more of the service execution codes provided by the user terminal in accordance with the execution probability.

12. The service providing method of claim 11, wherein the deleting the service execution code comprises deleting the service execution code of which the execution probability is less than or equal to a predetermined threshold value among the service execution codes provided by the user terminal.

13. A service providing system comprising:
a user terminal;
a service provider terminal configured to recognize the user terminal by transmitting and receiving at least one signal to and from the user terminal, and generate a service request message in accordance with the recognition of the user terminal, the service request message including identification information of a service being requested;
a service server configured to receive the service request message from the service provider terminal, determine a type of the service to be provided to the user terminal based on the identification information of the service included in the service request message, and transmit a service key corresponding to the service to the service provider terminal,
wherein the user terminal is configured to receive the service key from the service provider terminal, and transmit the service key to the service server, and
wherein the service server is further configured to transmit, to the user terminal, a service execution code used for providing the service if a first service key received by the service provider terminal coincides with a second service key received by the service server from the user terminal.

14. A service providing system comprising:
a user terminal;
a service provider terminal configured to generate a service request message, the service request message including identification information of a service being requested;
a service server configured to receive the service request message from the service provider terminal, determine a type of the service to be provided to the user terminal based on the identification information of the service included in the service request message, and transmit a service key corresponding to the service to the service provider terminal,
wherein the user terminal is located in a predetermined service area, and the user terminal is configured to receive the service key from the service provider terminal, and transmit the service key to the service server, and
wherein the service server is further configured to transmit, to the user terminal, a service execution code used for providing the service if a first service key received by the service provider terminal coincides with a second service key received by the service server from the user terminal.

* * * * *